US012230875B2

(12) United States Patent
Hunter et al.

(10) Patent No.: US 12,230,875 B2
(45) Date of Patent: Feb. 18, 2025

(54) PROTECTIVE STRUCTURE FOR PROTECTING ANTENNA FROM DAMAGE

(71) Applicant: Verizon Patent and Licensing Inc., Basking Ridge, NJ (US)

(72) Inventors: James Robert Hunter, Fleetwood, NC (US); Kevin L. Martin, Azle, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/388,201

(22) Filed: Nov. 9, 2023

(65) Prior Publication Data

US 2024/0072430 A1 Feb. 29, 2024

Related U.S. Application Data

(63) Continuation of application No. 17/744,804, filed on May 16, 2022, now Pat. No. 11,817,623.

(51) Int. Cl.
*H01Q 1/42* (2006.01)

(52) U.S. Cl.
CPC .................................... *H01Q 1/42* (2013.01)

(58) Field of Classification Search
CPC .......... H01Q 1/42; H01Q 1/421; H01Q 1/422; H01Q 1/424; H01Q 1/425; H01Q 1/427; H01Q 1/428
See application file for complete search history.

(56) References Cited

U.S. PATENT DOCUMENTS

| | | | | |
|---|---|---|---|---|
| 6,927,740 | B2 * | 8/2005 | Sergi | H01Q 1/12 343/846 |
| 2002/0149522 | A1 | 10/2002 | Hwang | |
| 2005/0184923 | A1 | 8/2005 | Saito et al. | |
| 2011/0303455 | A1 | 12/2011 | Swais et al. | |
| 2018/0034128 | A1 * | 2/2018 | Lachnitt | H01Q 1/3275 |

* cited by examiner

*Primary Examiner* — Daniel Munoz

(57) ABSTRACT

A protective structure, to protect an antenna from damage, is provided. The protective structure includes a body. The body defines one or more prong-receiving apertures in a first surface of the body, wherein through each aperture of the one or more prong-receiving apertures, the body is configured to receive a prong of one or more prongs of the antenna. The body defines a radio frequency (RF) connection aperture extending from the first surface of the body to a second surface of the body, wherein the body is configured to receive a cable through the RF connection aperture to couple a cable connector of the cable to an RF connector of the antenna.

20 Claims, 15 Drawing Sheets

PROTECTIVE STRUCTURE FOR PROTECTING ANTENNA FROM DAMAGE

RELATED APPLICATION

This application claims priority to and is a continuation of U.S. application Ser. No. 17/744,804, filed on May 16, 2022, entitled "PROTECTIVE STRUCTURE FOR PROTECTING ANTENNA FROM DAMAGE", which is incorporated by reference herein in its entirety.

BACKGROUND

An antenna may serve as an interface between radio waves propagating through space and electric currents in metal conductors. An antenna may be used with a transmitter and/or a receiver to send and/or receive signals.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
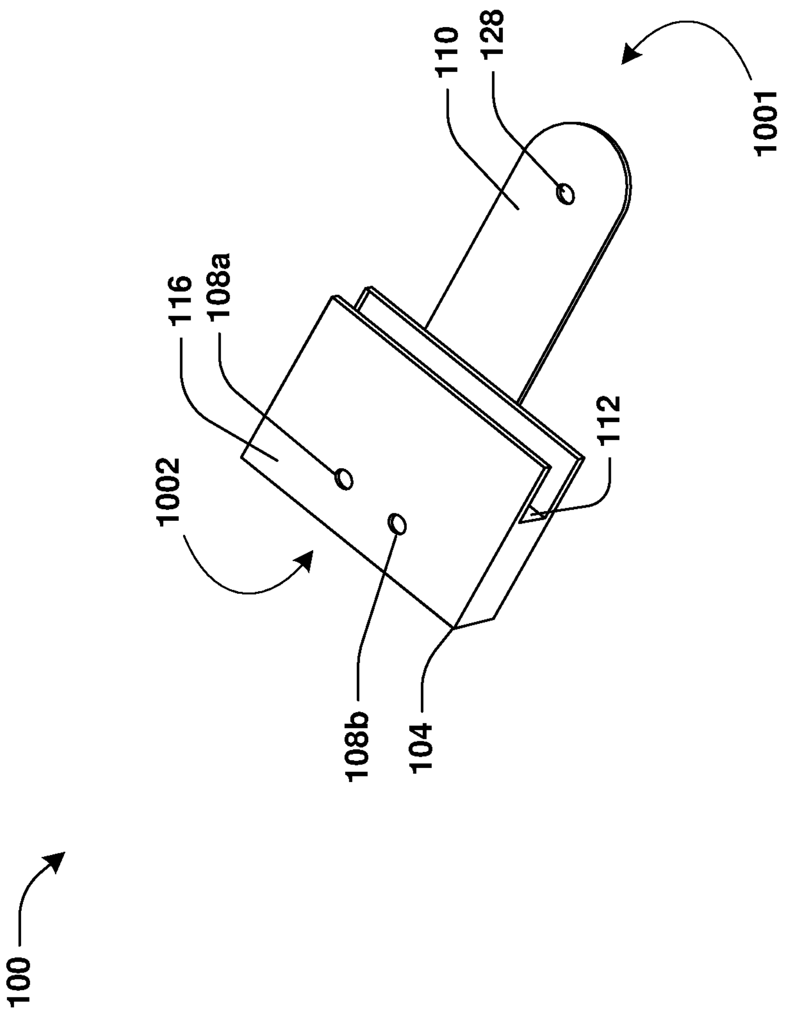
FIG. 1 is an illustration of a first perspective view of a protective structure according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as structures, apparatuses, methods, devices, components, and/or systems. Accordingly, this subject matter is not intended to be construed as limited to any example embodiments set forth herein. Rather, example embodiments are provided merely to be illustrative.

The following provides a discussion of some types of scenarios in which the disclosed subject matter may be utilized and/or implemented.

An antenna may be used for transmission and/or reception of radio signals over radio waves. In an example, the antenna may comprise a broadband measurement antenna. For example, the antenna may be used for mobile measurement and/or direction finding applications. Alternatively and/or additionally, the antenna may be configured for electromagnetic interference (EMI) measurement and/or electromagnetic compatibility (EMC) measurement. The antenna may be coupled to a communication device, such as a receiver and/or a transmitter. For example, the antenna may be coupled to the communication device via a cable, such as a coaxial cable (e.g., a radio frequency (RF) coaxial cable). For example, a first cable connector of the cable (e.g., at a first end of the cable) may be coupled to a connector (e.g., an RF connector) of the antenna and a second cable connector of the cable (e.g., at a second end of the cable) may be coupled to the communication device. The communication device may comprise a measurement device configured to measure and/or detect electromagnetic interference (EMI), electromagnetic compatibility (EMC), etc. using the antenna. In an example, the communication device may comprise a spectrum analyzer (e.g., a spectrum analyzer for EMC measurement). The communication device 1502 and/or the antenna 802 may be used to measure RF performance. For example, the communication device and/or the antenna may be used to detect and/or identify interference sources that introduce interference that can degrade performance and/or a capacity associated with wireless communication between wireless communication sites and user equipments (UEs). For example, the interference may worsen a quality of telecommunication services provided by the wireless communication sites to the UEs, such as at least one of cellular service (e.g., 5G service, 4G service and/or other type of cellular service), internet service (e.g., cellular internet service, satellite internet service, 5G internet service, and/or other type of internet service), messaging service, etc. In response to identifying an interference source, corrective action may be taken to mitigate the interference source to improve network performance of one or more wireless communication sites.

However, one or more components associated with the antenna, such as the connector of the antenna, the cable coupled to the connector, etc., may be exposed and/or insufficiently protected from damage. Accordingly, the one or more components may become damaged due to collisions of the antenna with other objects (such as when the antenna is dropped onto the ground) and/or due to wear and tear on the cable and/or the connector during regular usage of the antenna, thus requiring that the one or more components (and/or the antenna) be replaced, repaired, etc.

Thus, in accordance with the present disclosure, a protective structure is provided that is configured to be attached to the antenna. The protective structure comprises a body with apertures that receive one or more prongs of the antenna, the connector of the antenna and/or the cable. The protective structure may comprise a tongue (attached to the body, for example) with an aperture through which a mounting apparatus is attached to the antenna, wherein attaching the mounting apparatus to the antenna through the aperture attaches the antenna to the protective structure. When the protective structure is attached to the antenna, the protective structure may protect the one or more components (e.g., at least one of the connector, the cable, etc.) from damage and/or may increase a longevity of the antenna. The protective structure being attached to the antenna may not have a negative effect on performance of the antenna.

Figure 2:
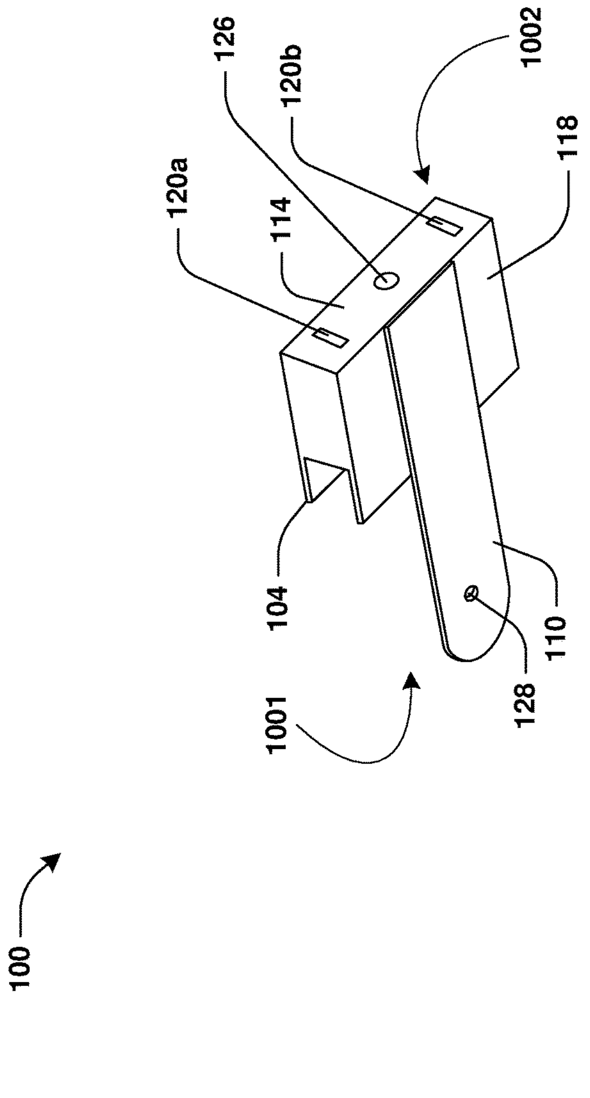
FIG. 2 is an illustration of a second perspective view of a protective structure according to some embodiments.
Figure 3:
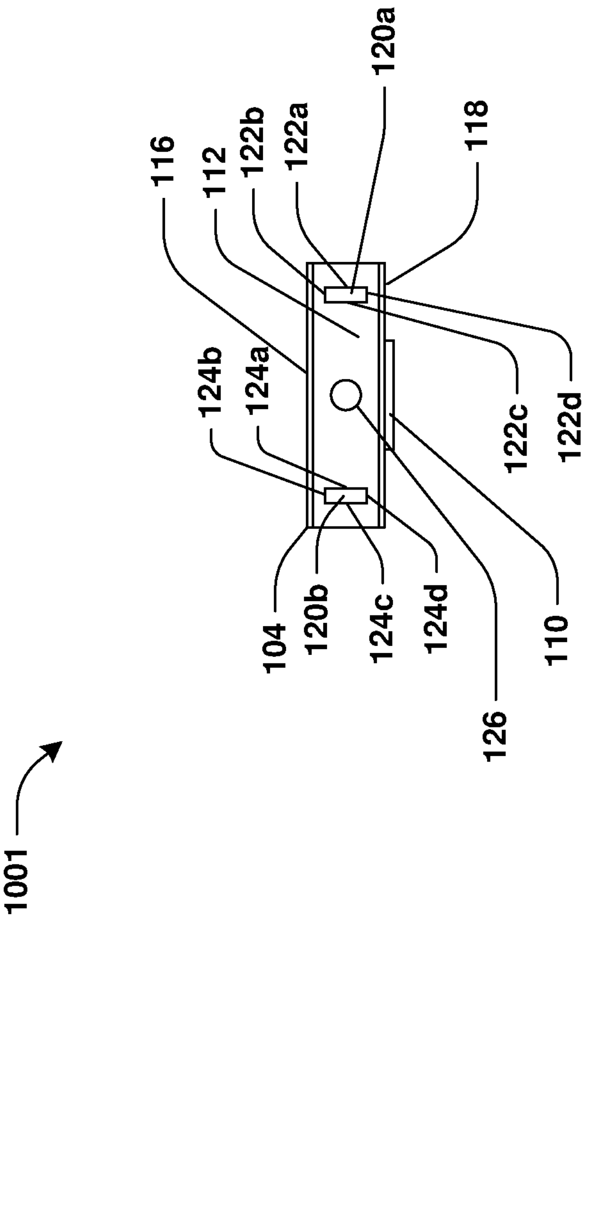
FIG. 3 is an illustration of a first side of a protective structure according to some embodiments.
Figure 4:
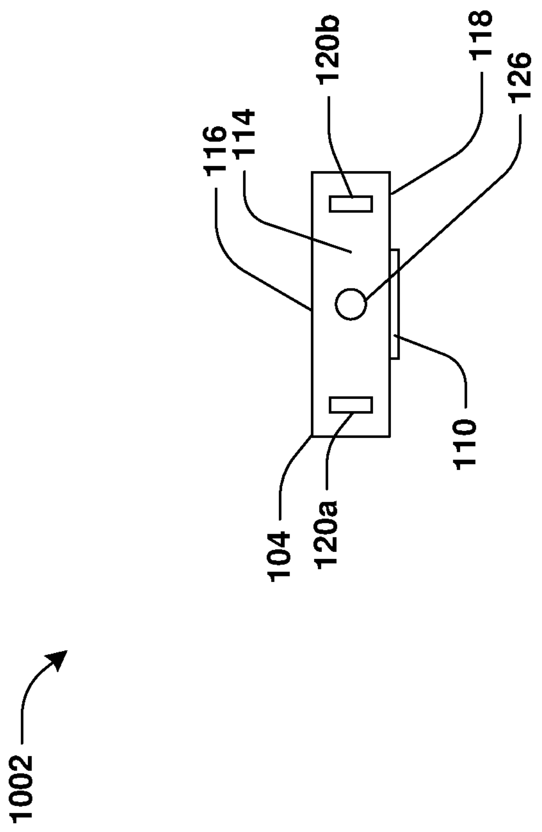
FIG. 4 is an illustration of a second side of a protective structure according to some embodiments.
Figure 5:
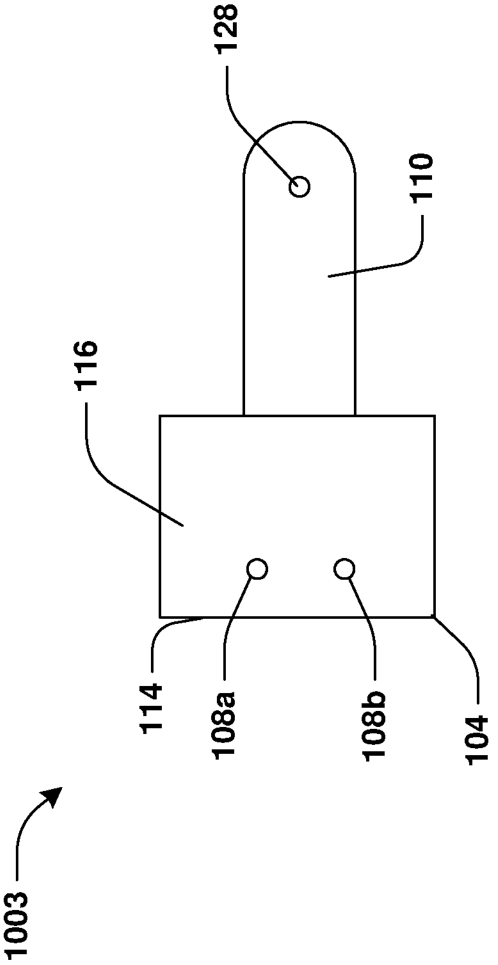
FIG. 5 is an illustration of a third side of a protective structure according to some embodiments.
Figure 6:
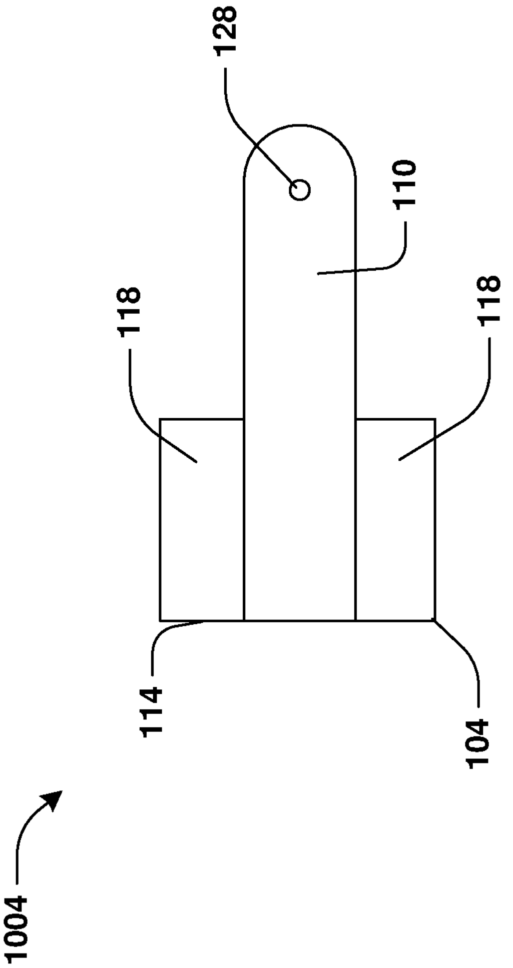
FIG. 6 is an illustration of a fourth side of a protective structure according to some embodiments.
Figure 7:
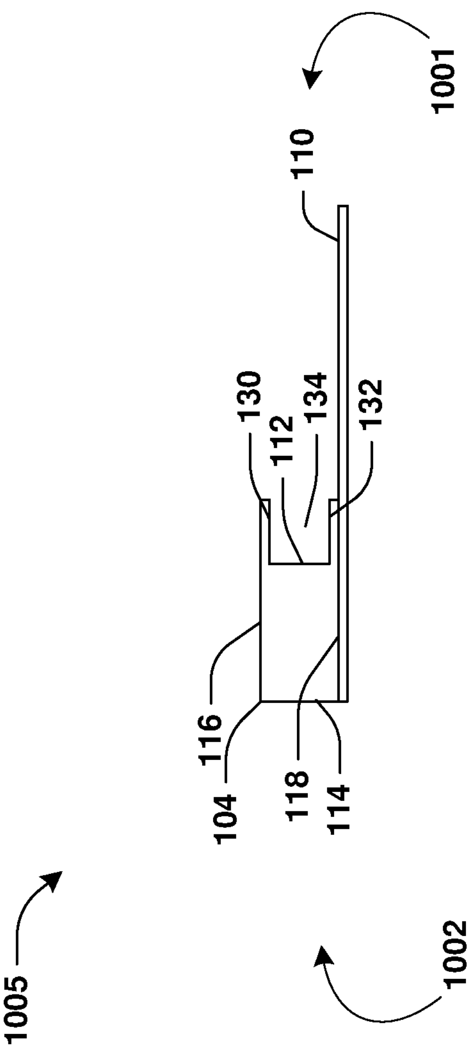
FIG. 7 is an illustration of a fifth side of a protective structure according to some embodiments.

FIGS. 1-7 illustrate a protective structure 100, according to some embodiments. FIG. 1 illustrates a first perspective view of the protective structure 100. FIG. 2 illustrates a second perspective view of the protective structure 100. FIG. 3 illustrates a first side 1001 of the protective structure 100, which is also apparent in the first perspective view of FIG. 1. FIG. 4 illustrates a second side 1002 of the protective structure 100, which is also apparent in the second perspective view of FIG. 2. The first side 1001 of the protective structure 100 is opposite the second side 1002 of the protective structure 100. FIG. 5 illustrates a third side 1003 of the protective structure 100, which is also apparent in the first perspective view of FIG. 1. FIG. 6 illustrates a fourth side 1004 of the protective structure 100, which is also apparent in the second perspective view of FIG. 2. The third side 1003 of the protective structure 100 is opposite the fourth side 1004 of the protective structure 100. FIG. 7 illustrates a fifth side 1005 of the protective structure 100, which is also apparent in the first perspective view of FIG. 1.

Figure 8:
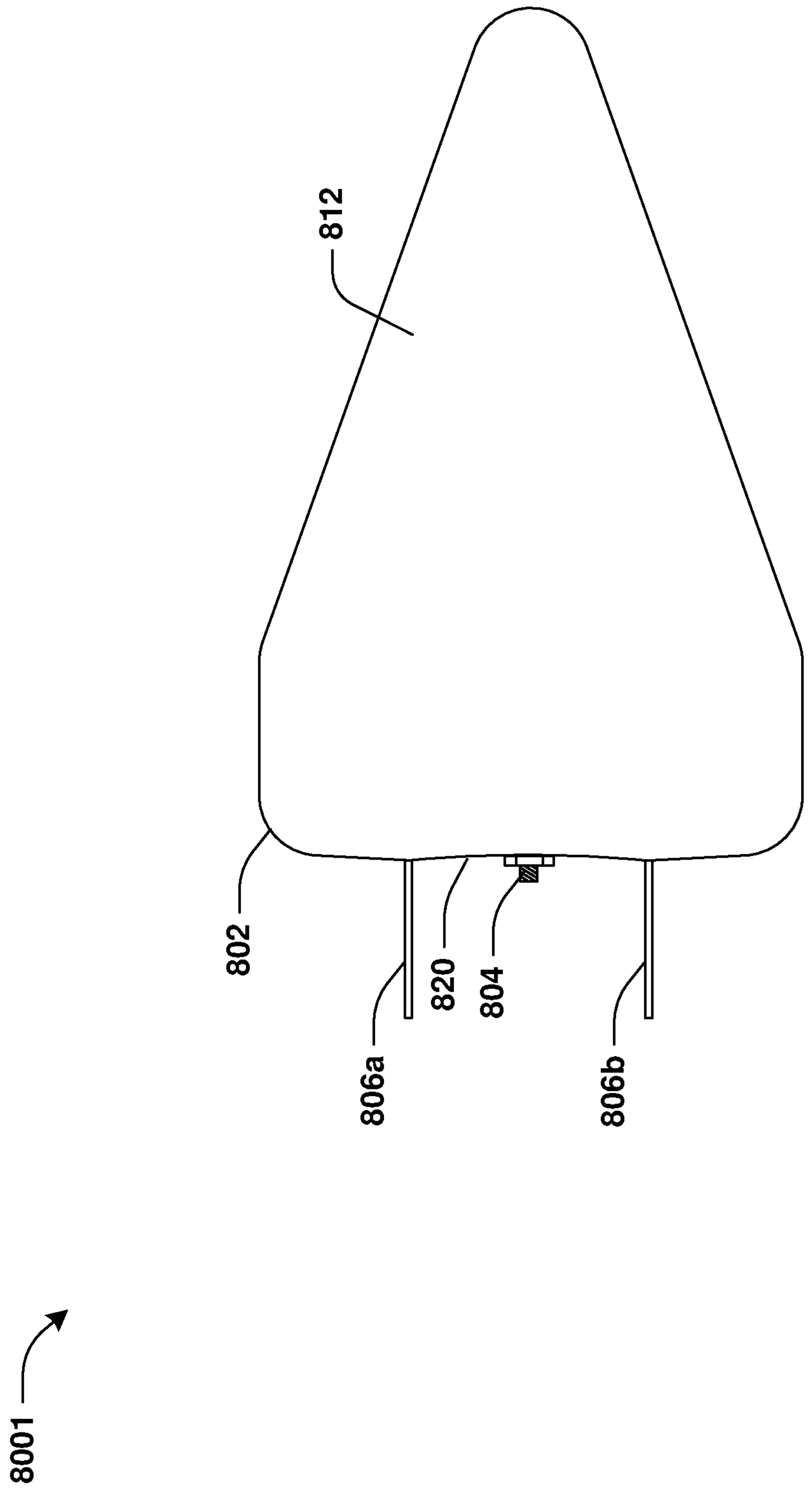
FIG. 8 is an illustration of a first side of an antenna according to some embodiments.
Figure 9:
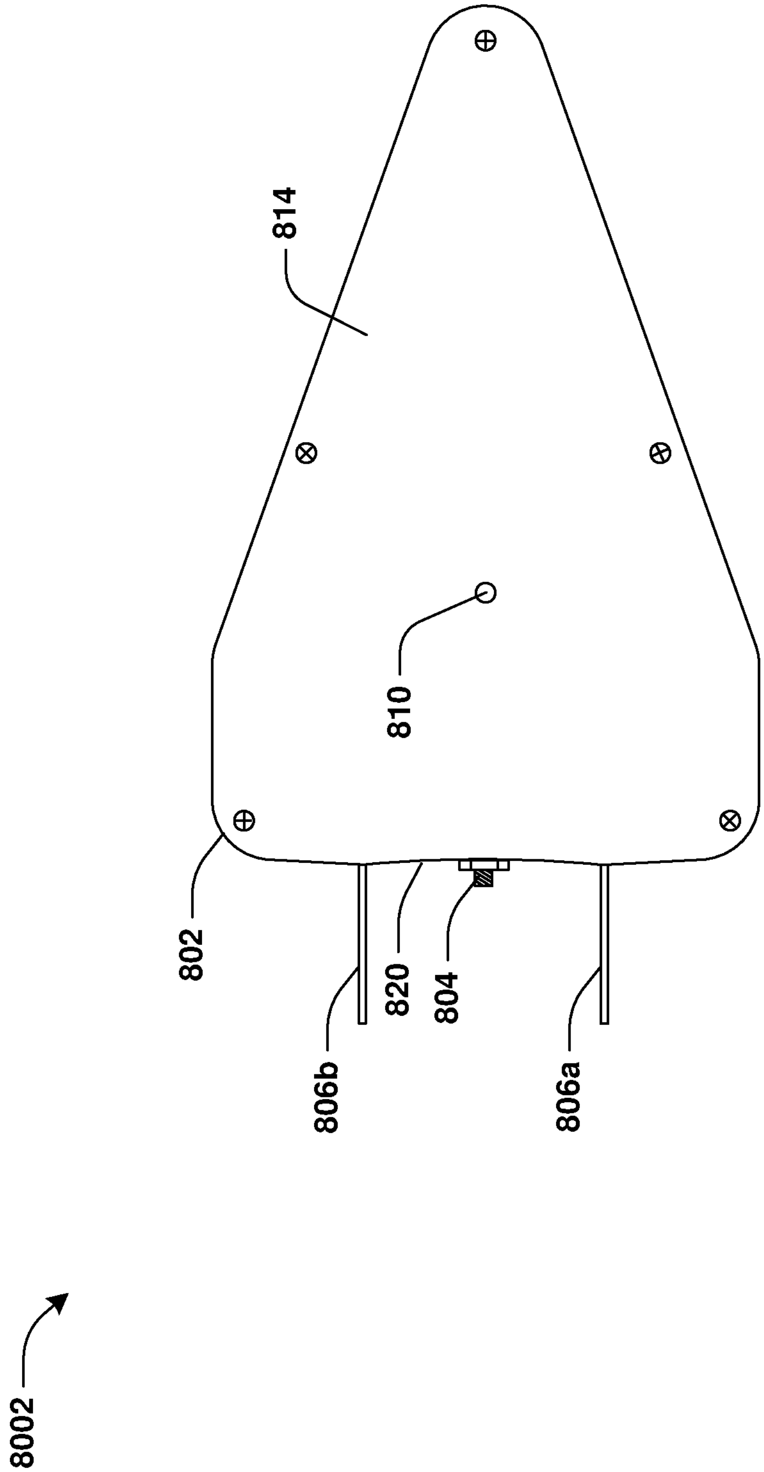
FIG. 9 is an illustration of a second side of an antenna according to some embodiments.
Figure 10:
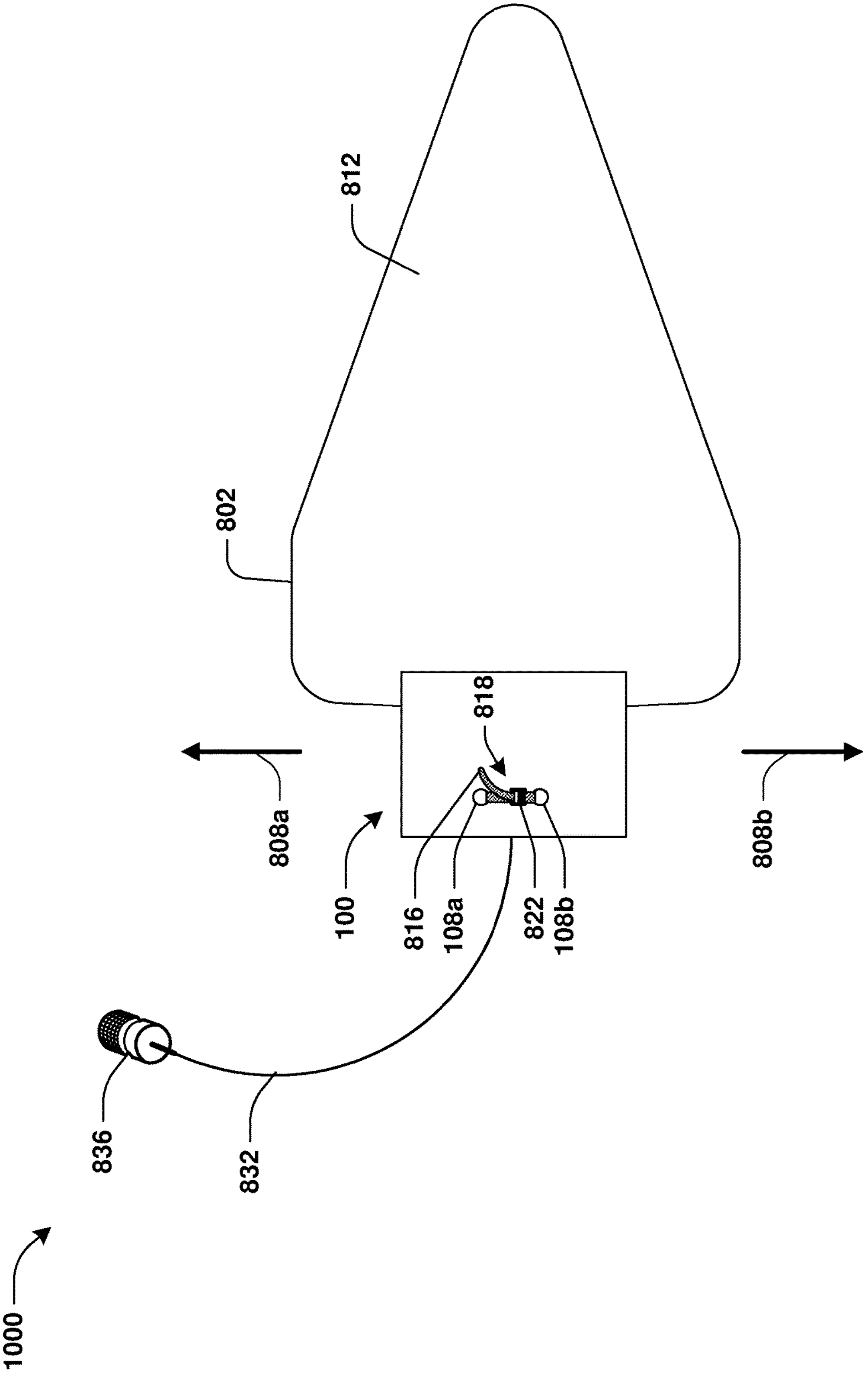
FIG. 10 is an illustration of a first side of an apparatus, comprising an antenna and a protective structure, according to some embodiments.
Figure 11:
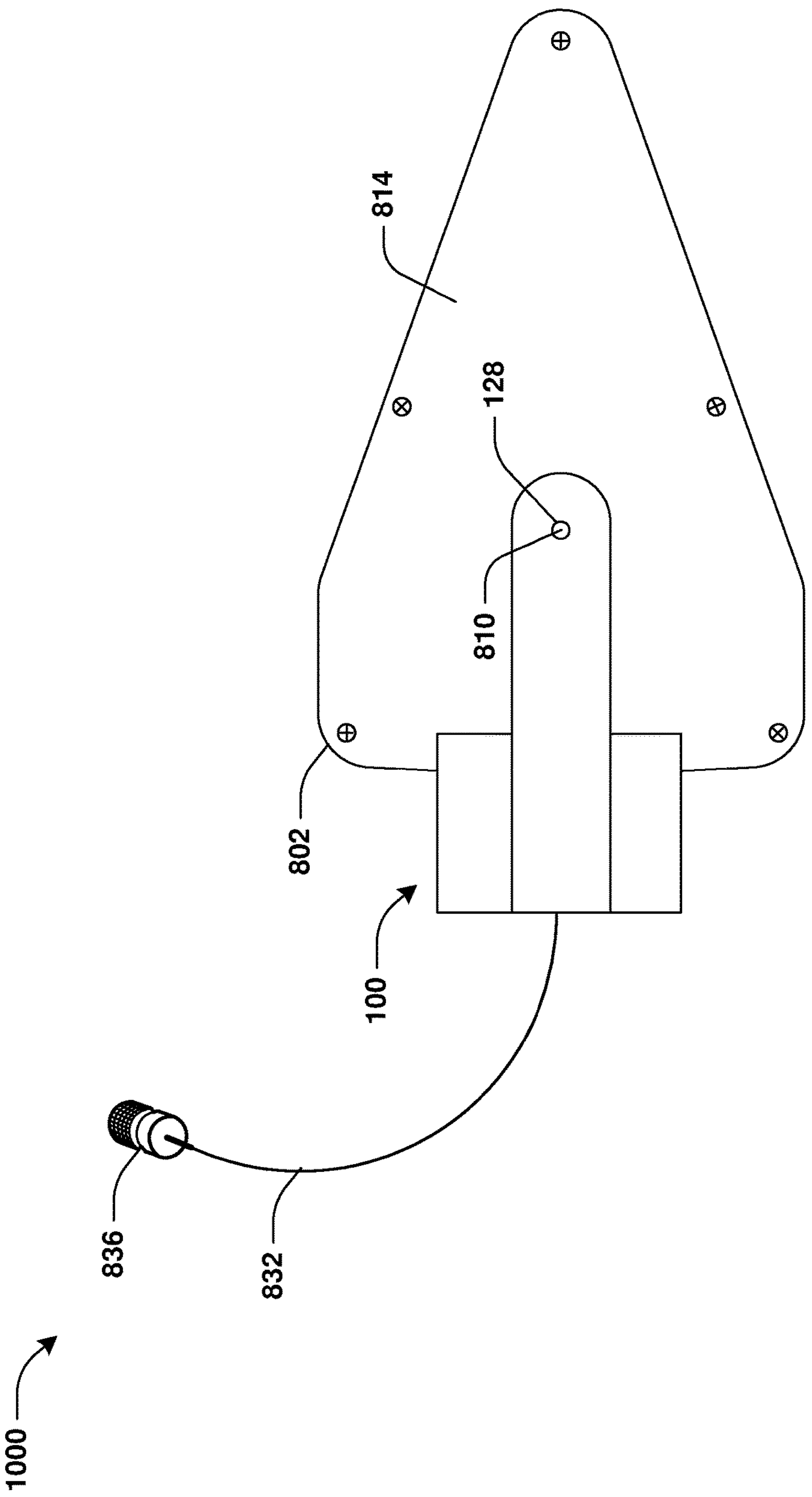
FIG. 11 is an illustration of a second side of an apparatus, comprising an antenna and a protective structure, according to some embodiments.
Figure 12:
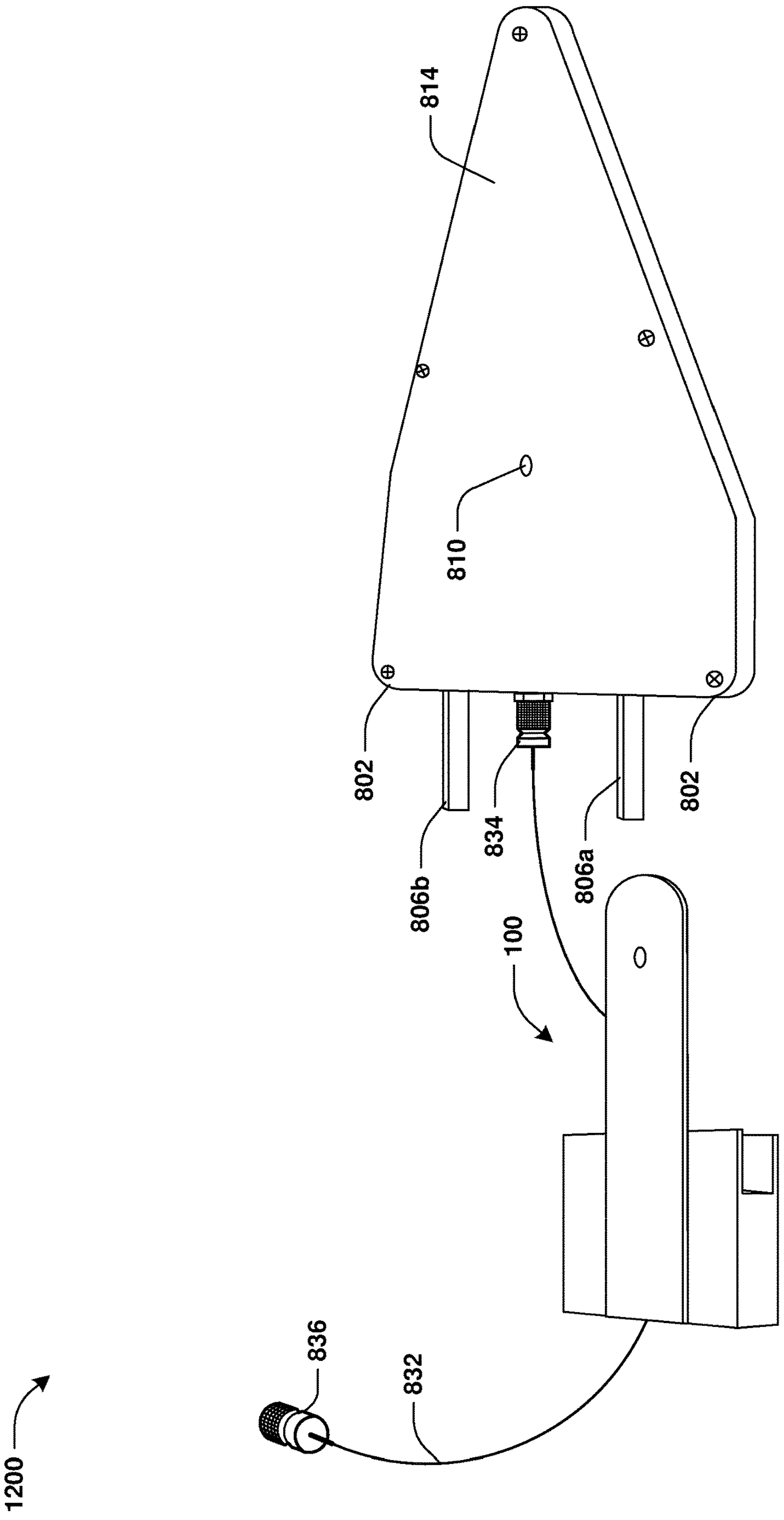
FIG. 12 is an illustration of a perspective view of an antenna and a protective structure according to some embodiments.
Figure 13:
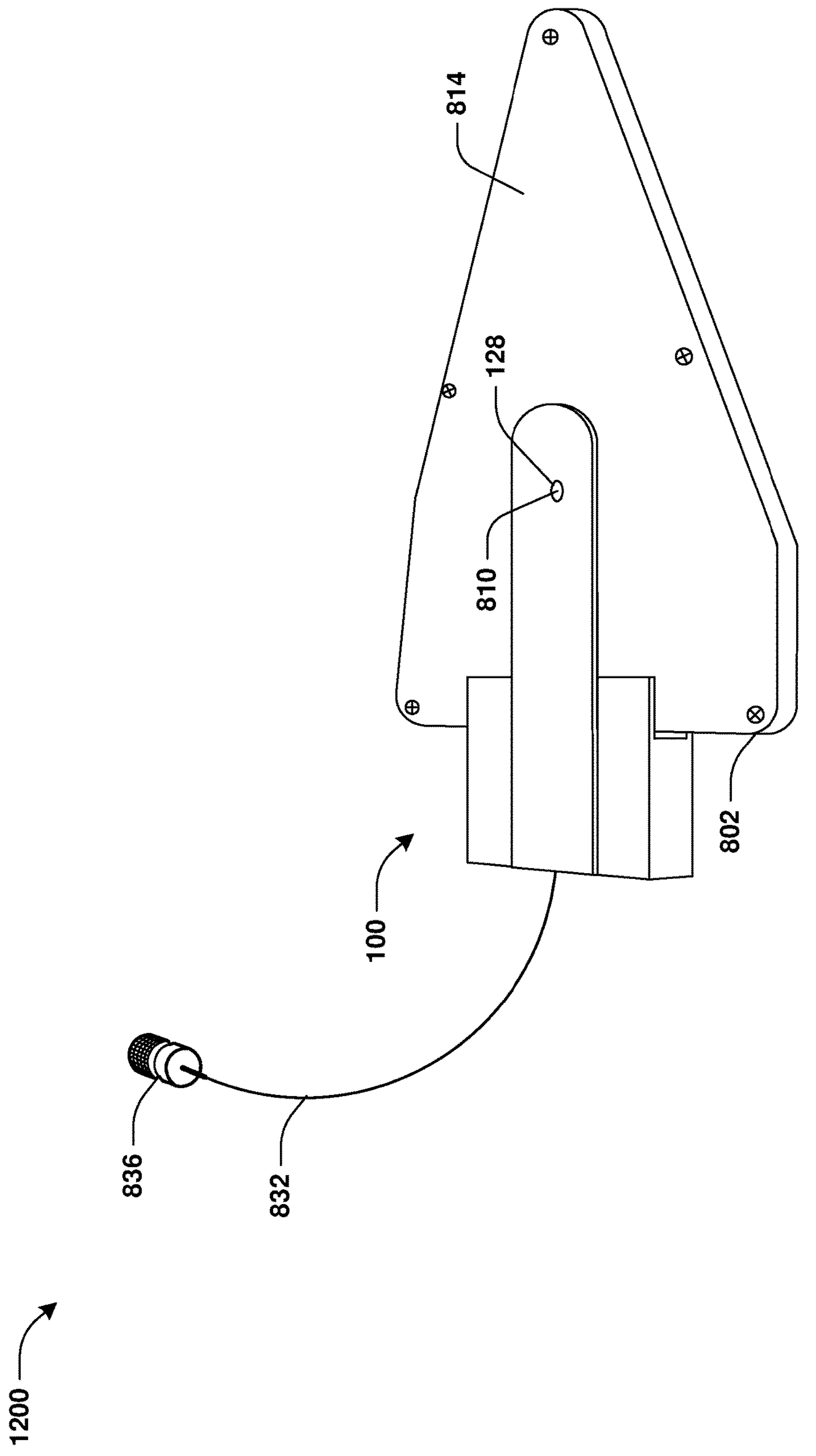
FIG. 13 is an illustration of a perspective view of an antenna and a protective structure according to some embodiments.
Figure 14:
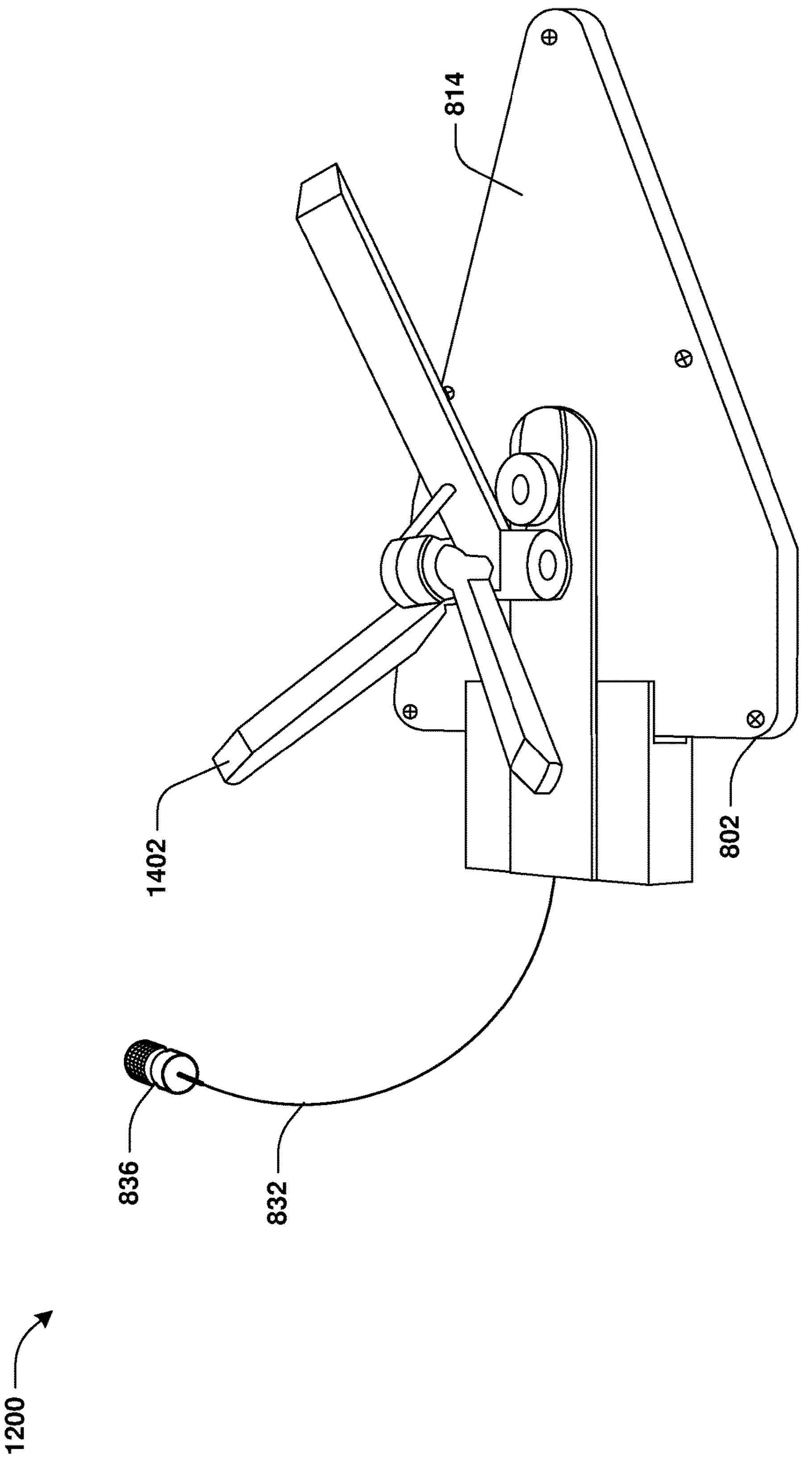
FIG. 14 is an illustration of a perspective view of an antenna and a protective structure according to some embodiments.

The protective structure 100 may be configured to protect an antenna 802 (shown in FIGS. 8-14) from damage. For example, the protective structure 100 may be attached to the antenna 802 and/or may prevent and/or inhibit damage to a connector 804 (shown in FIGS. 8-9) of the antenna 802 and/or a cable 832 (shown in FIGS. 10-15) coupled to the connector 804. FIGS. 8-9 illustrate the antenna 802, according to some embodiments. FIG. 8 illustrates a first side 8001 (e.g., a top side), of the antenna 802, corresponding to a first surface 812 (e.g., a top surface) of the antenna 802. FIG. 9 illustrates a second side 8002 (e.g., a bottom side), of the antenna 802, corresponding to a second surface 814 (e.g., a bottom surface) of the antenna 802. FIGS. 10-11 illustrate an apparatus 1000, comprising the antenna 802 and the protective structure 100, when the protective structure 100 is attached to the antenna 802, according to some embodiments. FIG. 10 illustrates a first side (e.g., a top side), of the apparatus 1000, corresponding to the first surface 812 (e.g., the top surface) of the antenna 802. FIG. 11 illustrates a second side (e.g., a bottom side), of the apparatus 1000, corresponding to the second surface 814 (e.g., the bottom surface) of the antenna 802. FIGS. 12-14 illustrate perspective views of the antenna 802 and the protective structure 100, according to some embodiments.

Referring to FIG. 1, the protective structure 100 may comprise a body 104 and/or a tongue 110. The body 104 comprises a first surface 112 (shown in FIGS. 1, 3 and 7), a second surface 114 (shown in FIGS. 2 and 4-7), a third surface 116 (shown in FIGS. 1, 3-5, and 7), and/or a fourth surface 118 (shown in FIGS. 2-4 and 6-7).

The tongue 110 may be attached to the body 104 (e.g., the tongue 110 may be attached to the fourth surface 118 of the body 104). It will be appreciated that, as used herein, by being attached, the body 104 and the tongue 110 are not limited to comprising two separate structures that are attached. Rather, in an example, the body 104 and the tongue 110 may be integrally formed, one piece formed, a single composite piece, etc. In some examples, the body 104 and the tongue 110 may comprise two separate structures that are attached, such as with mechanical fasteners, welding, adhesives, etc. In some examples, the body 104 and the tongue 110 (e.g., the protective structure 100 as a whole) may be formed via at least one of 3D printing (e.g., using 3D printable material, such as 3D printable plastic), additive manufacturing, etc.

In some examples, the body 104 defines one or more prong-receiving apertures 120 (shown in FIGS. 2-4) in the first surface 112 of the body 104. For example, an aperture of the one or more prong-receiving apertures 120 may extend from the first surface 112 of the body 104 to the second surface 114 of the body 104. Although FIGS. 2-4 show an embodiment in which the one or more prong-receiving apertures 120 extend from the first surface 112 of the body 104 to the second surface 114 of the body 104, embodiments are contemplated in which the one or more prong-receiving apertures 120 extend merely partially through the body 104 such that the one or more prong-receiving apertures 120 do not reach the second surface 114.

In some examples, through each aperture of the one or more prong-receiving apertures 120, the body 104 is configured to receive a prong of one or more prongs 806 (shown in FIGS. 8-9 and 12) of the antenna 802. In an example, when the protective structure 100 is attached to the antenna 802, each prong of the one or more prongs 806 extends at least partially through an aperture of the one or more prong-receiving apertures 120. In an example, the one or more prong-receiving apertures 120 comprise a first prong-receiving aperture 120*a* and/or a second prong-receiving aperture 120*b*. The body 104 may be configured to receive a first prong 806*a* of the one or more prongs 806 through the first prong-receiving aperture 120*a* (e.g., when the protective structure 100 is attached to the antenna 802, the first prong 806*a* may extend at least partially through the first prong-receiving aperture 120*a*). The body 104 may be configured to receive a second prong 806*b* of the one or more prongs 806 through the second prong-receiving aperture 120*b* (e.g., when the protective structure 100 is attached to the antenna 802, the second prong 806*b* may extend at least partially through the second prong-receiving aperture 120*b*).

In some examples, the first prong-receiving aperture 120*a* is defined by a first plurality of inner sidewalls 122 (shown in FIG. 3) of the body 104. In an example, the first plurality of inner sidewalls 122 comprises at least three sidewalls. For example, the first plurality of inner sidewalls 122 may comprise four sidewalls 122*a*, 122*b*, 122*c* and 122*d*, wherein the sidewall 122*a* faces the sidewall 122*c*, and/or wherein the sidewall 122*b* faces the sidewall 122*d*. In some examples, when the protective structure 100 is attached to the antenna 802, one, some and/or all sidewalls of the first plurality of inner sidewalls 122 are in contact with the first prong 806*a* (that extends at least partially through the first prong-receiving aperture 120*a*). For example, one, some and/or all sidewalls of the first plurality of inner sidewalls 122 may be in contact with one, some and/or all outer sidewalls of the first prong 806*a* of the antenna 802. In some examples, one or more sidewalls of the first plurality of inner sidewalls 122 (e.g., one, some and/or all sidewalls, of the first plurality of inner sidewalls 122, that are in contact with the first prong 806*a*) support (e.g., maintain) a position of the protective structure 100 relative to the antenna 802 and/or inhibit displacement of the protective structure 100 relative to the antenna 802 (when the protective structure 100 is attached to the antenna 802). For example, when the protective structure 100 is attached to the antenna 802, the one or more sidewalls may inhibit displacement of the protective structure 100 (relative to the antenna 802) along a first direction 808*a* and/or a second direction 808*b* (shown in FIG. 10). In some examples, a first shape of the first prong-receiving aperture 120*a* (e.g., a shape defined by the first plurality of inner sidewalls 122) may match a second shape (e.g., a cross-sectional shape) of the first prong 806*a* of the antenna 802. In an example, such as shown in FIGS. 2-4, the first shape and the second shape may be rectangular, such as a rounded rectangle with one or more rounded corners (not shown) or a rectangle with sharp (e.g., non-rounded) corners. Embodiments are contemplated in which the first shape and the second shape are not rectangular, such as where the first shape and the second shape are triangular, circular, or other shape. A size of the first prong-receiving aperture 120*a* may be about the same as (and/or larger than) a size (e.g., a cross-sectional size) of the first prong 806*a* such that the first prong 806*a* fits inside of the first prong-receiving aperture 120*a*.

In some examples, the second prong-receiving aperture 120*b* is defined by a second plurality of inner sidewalls 124 (shown in FIG. 3) of the body 104. In an example, the second plurality of inner sidewalls 124 comprises at least three sidewalls. For example, the second plurality of inner sidewalls 124 may comprise four sidewalls 124*a*, 124*b*, 124*c* and 124*d*, wherein the sidewall 124*a* faces the sidewall 124*c*, and/or wherein the sidewall 124*b* faces the sidewall 124*d*. In some examples, when the protective structure 100 is attached to the antenna 802, one, some and/or all sidewalls of the second plurality of inner sidewalls 124 are in contact with the second prong 806*b* (that extends at least partially through the second prong-receiving aperture 120*b*). For example, one, some and/or all sidewalls of the second plurality of inner sidewalls 124 may be in contact with one, some and/or all outer sidewalls of the second prong 806*b* of the antenna 802. In some examples, one or more sidewalls of the second plurality of inner sidewalls 124 (e.g., one, some and/or all sidewalls, of the second plurality of inner sidewalls 124, that are in contact with the second prong 806*b*) support (e.g., maintain) a position of the protective structure 100 relative to the antenna 802 and/or inhibit displacement of the protective structure 100 relative to the antenna 802 (when the protective structure 100 is attached to the antenna 802). For example, when the protective structure 100 is attached to the antenna 802, the one or more sidewalls inhibit displacement of the protective structure 100 (relative to the antenna 802) along the first direction 808*a* and/or the second direction 808*b*. In some examples, a third shape of the second prong-receiving aperture 120*b* (e.g., a shape defined by the second plurality of inner sidewalls 124) may match a fourth shape (e.g., a cross-sectional shape) of the second prong 806*b* of the antenna 802. In an example, such as shown in FIGS. 2-4, the third shape and the fourth shape may be rectangular, such as a rounded rectangle with one or more rounded corners (not shown) or a rectangle with sharp (e.g., non-rounded) corners. Embodiments are contemplated in which the third shape and the fourth shape are not rectangular, such as where the third shape and the fourth shape are triangular, circular, or other shape. A size of the second prong-receiving aperture 120*b* may be about the same as (and/or larger than) a size (e.g., a cross-sectional size) of the second prong 806*b* such that the second prong 806*b* fits inside of the second prong-receiving aperture 120*b*.

In some examples, the body 104 defines an RF connection aperture 126 (shown in FIGS. 2-4) extending from the first surface 112 of the body 104 to the second surface 114 of the body 104. In some examples, the body 104 is configured to receive the cable 832 through the RF connection aperture 126 to couple a first cable connector 834 (shown in FIG. 12) of the cable 832 to the connector 804 (e.g., RF connector) of the antenna 802. In some examples, when the protective structure 100 is attached to the antenna 802, the cable 832 extends at least partially through the RF connection aperture 126. In some examples, when the protective structure 100 is attached to the antenna 802, at least a portion of the connector 804 of the antenna 802 may be within the RF connection aperture 126. The first cable connector 834 of the cable 832 may be coupled to the connector 804 of the antenna 802 when the protective structure 100 is attached to the antenna 802.

In some examples, the RF connection aperture 126 is between the first prong-receiving aperture 120*a* and the second prong-receiving aperture 120*b*. In some examples, a direction of extension of a prong-receiving aperture of the one or more prong-receiving apertures 120 (e.g., a direction of extension of the first prong-receiving aperture 120*a* and/or the second prong-receiving aperture 120*b*) is parallel to a direction of extension of the RF connection aperture 126. Alternatively and/or additionally, the third surface 116 and/or the fourth surface 118 may be parallel to the direction of extension of the RF connection aperture 126 and/or may be parallel to a direction of extension of a prong-receiving aperture of the one or more prong-receiving apertures 120 (e.g., a direction of extension of the first prong-receiving aperture 120*a* and/or the second prong-receiving aperture 120*b*).

In some examples, the tongue 110 defines an antenna attachment aperture 128 (shown in FIGS. 1-2 and 5-6). The antenna 802 may comprise a first attachment unit 810 (shown in FIGS. 9 and 11-13). When the protective structure 100 is attached to the antenna 802, the antenna attachment aperture 128 may be aligned with the first attachment unit 810 of the antenna 802 (such as shown in FIGS. 11 and 13). The antenna attachment aperture 128 may be used to attach a second attachment unit to the first attachment unit 810. For example, the first attachment unit 810 and the second attachment unit may be fastened together via the antenna attachment aperture 128. Fastening the second attachment unit to the first attachment unit 810 may attach the protective structure 100 to the antenna 802. In some examples, the second attachment unit may be part of a mounting apparatus 1402 (shown in FIG. 14), such as at least one of a tripod, a handle, or other type of apparatus configured to mount and/or hold the antenna 802 in a position (e.g., a stable position). In an example in which the second attachment unit is part of a tripod, the first attachment unit 810 may comprise a tripod socket (e.g., an integrated tripod socket, such as an integrated ¼-inch tripod socket). Accordingly, fastening the second attachment unit to the first attachment unit 810 may attach the mounting apparatus 1402 and the protective structure 100 to the antenna 802 (such as shown in FIG. 14). Embodiments are contemplated in which the second attachment unit is not part of the mounting apparatus 1402, such as where the second attachment unit comprises a standalone fastener, such as at least one of a standalone screw, a standalone bolt, a standalone nut, etc.

In a first example, the first attachment unit 810 comprises a female thread (e.g., an internal thread) and the second attachment unit comprises a male thread (e.g., an external thread), such as where the second attachment unit comprises a male fastener (e.g., at least one of a screw, a bolt, etc.) and/or where the second attachment unit is fastened to the first attachment unit 810 via the antenna attachment aperture 128 (via engagement of the male thread of the second attachment unit with the female thread of the first attachment unit 810). In the first example, the tongue 110 may be configured to receive the second attachment unit through the antenna attachment aperture 128 to attach the protective structure 100 (and/or the mounting apparatus 1402) to the antenna 802 (via engagement of the male thread of the second attachment unit with the female thread of the first attachment unit 810).

In a second example, the first attachment unit 810 comprises a male thread (e.g., an external thread) and the second attachment unit comprises a female thread (e.g., an internal thread), such as where the first attachment unit 810 comprises a male fastener (e.g., at least one of a screw, a bolt, etc.) and/or where the first attachment unit 810 is fastened to the second attachment unit via the antenna attachment aperture 128 (via engagement of the male thread of the first attachment unit 810 with the female thread of the second attachment unit). In the second example, the tongue 110 may be configured to receive the first attachment unit 810 through the antenna attachment aperture 128 to attach the protective structure 100 (and/or the mounting apparatus 1402) to the antenna 802 (via engagement of the male thread of the first attachment unit 810 with the female thread of the second attachment unit).

In some examples, such as shown in FIG. 7, the body 104 comprises a first protruding wall 130 and a second protruding wall 132, wherein the first surface 112 of the body 104 may extend from the first protruding wall 130 to the second protruding wall 132, and/or wherein the first protruding wall 130 may face the second protruding wall 132. The first protruding wall 130, the second protruding wall 132 and/or the first surface 112 may define a space 134 (shown in FIG. 7) (e.g., a space between the first protruding wall 130 and the second protruding wall 132). When the protective structure 100 is attached to the antenna 802, a portion of the antenna 802 may be within the space 134. In some examples, the first protruding wall 130 and/or the second protruding wall 132 are in contact with the antenna 802 when the protective structure 100 is attached to the antenna 802. For example, the first protruding wall 130 may be in contact with the first surface 812 of the antenna 802 (shown in FIGS. 8 and 10) and/or the second protruding wall 132 may be in contact with the second surface 814 of the antenna 802 (shown in FIGS. 8 and 11-14) opposite the first surface 812 of the antenna 802. The first surface 812 of the antenna 802 may correspond to a top surface of the antenna 802 and/or the second surface 814 of the antenna 802 may correspond to a bottom surface of the antenna 802. In some examples, the first protruding wall 130 and/or the second protruding wall 132 support (e.g., maintain) a position of the protective structure 100 relative to the antenna 802 and/or inhibit displacement of the protective structure 100 relative to the antenna 802 (when the protective structure 100 is attached to the antenna 802).

In some examples, the body 104 defines one or more fastener-receiving apertures 108 (shown in FIGS. 1, 5 and 10) in the third surface 116 of the body 104. The body 104 may be configured to receive a strain relief fastener, through the one or more fastener-receiving apertures 108, to provide strain relief to the cable 832 and/or the connector 804 of the antenna 802.

Referring to FIGS. 8-9, the one or more prongs 806 and/or the connector 804 may be attached to a third surface 820 of a body of the antenna 802. The third surface 820 may extend from the first surface 812 of the antenna 802 to the second surface 814 of the antenna 802. It will be appreciated that, as used herein, by being attached, the body of the antenna 802 and the one or more prongs 806 are not limited to comprising separate structures that are attached. Rather, in an example, the body of the antenna 802 and the one or more prongs 806 may be integrally formed, one piece formed, a single composite piece, etc. In some examples, the body of the antenna 802 and the one or more prongs 806 may comprise separate structures that are attached, such as with mechanical fasteners, welding, adhesives, etc.

Referring to FIG. 10, the strain relief fastener may comprise a cable tie 818, such as at least one of a zip tie, a hose tie, a tie wrap, etc., and/or the strain relief fastener may comprise one or more other types of fasteners. In some examples, the one or more fastener-receiving apertures 108 comprise a first fastener-receiving aperture **108*a* and a second fastener-receiving aperture 108*b*. As the cable tie 818 is fed into the body 104 through a fastener-receiving aperture of the one or more fastener-receiving apertures 108, the body 104 may be configured to channel the cable tie 818 to exit the body 104 through another fastener-receiving aperture of the one or more fastener-receiving apertures 108. In an example, the body 104 may define a channel (not shown) between the first fastener-receiving aperture 108*a* and the second fastener-receiving aperture 108*b*. For example, a first end 816 of the cable tie 818 may be fed into the body 104 through the first fastener-receiving aperture 108*a*, wherein the first end 816 may be conducted, by the channel, to the second fastener-receiving aperture 108*b* and may exit the body 104 through the second fastener-receiving aperture 108*b*. The first end 816 may correspond to a free end of the cable tie 818 (e.g., an end, of the cable tie 818, that does not comprise a ratchet), and/or the first end 816 may be pointed. The first end 816 may be fed through a ratchet mechanism 822 (e.g., the ratchet mechanism 822 may comprise a case and/or a ratchet within the case). The ratchet mechanism 822 may be at a second end of the cable tie 818 opposite the first end 816 of the cable tie 818. When the first end 816 is fed through the ratchet mechanism 822, the ratchet of the ratchet mechanism 822 may engage with teeth (e.g., integrated teeth) along the cable tie 818 to prevent the first end 816 from being pulled back. The cable tie 818 may be further pulled through the ratchet mechanism 822 to tighten the cable tie 818, wherein the ratchet of the ratchet mechanism 822 and/or the integrated teeth on the cable tie 818 may prevent the cable tie 818 from becoming undone. The cable tie 818 may be fed through the one or more fastener-receiving apertures 108 and/or may be tightened while the cable 832 extends through the RF connection aperture 126 and/or while the first cable connector 834 is coupled to the connector 804 of the antenna 802. Accordingly, the cable tie 818 may bind the cable 832 to an inner surface of the body 104, where tightening the cable tie 818 may increase the binding strength applied to the cable 832 using the cable tie 818. It may be appreciated that binding the cable 832 to the inner surface of the body 104 using the cable tie 818 may provide strain relief to the cable 832 and/or the connector 804 of the antenna 802. Alternatively and/or additionally, binding the cable 832 to the inner surface of the body 104 using the cable tie 818 may protect the cable 832 and/or the connector 804 from damage, such as by way of mitigating strain on the cable 832 and/or the connector 804 during one or more of the following situations: (i) the antenna 802 is held up by the cable 832, (ii) the cable 832 is pulled on, (iii) the antenna 802 falls and someone grabs the cable 832 to prevent the antenna 802 from hitting the ground, and/or (iv) one or more other situations (e.g., in these situations, a force, that would otherwise be absorbed by and/or damage the connector 804 if the cable 832 was not bound using the cable tie 818, may be absorbed by the cable tie 818 and/or the cable 832 as a result of the cable 832 being bound using the cable tie 818**).

FIGS. 12-14 illustrate various stages of an example process 1200 for attaching the protective structure 100 to the antenna 802. The example process 1200 may comprise: a first act comprising feeding the cable 832 through the RF connection aperture 126; a second act (performed after the first act, for example) comprising coupling the first cable connector 834 of the cable 832 to the connector 804 of the antenna 802 (e.g., the configuration shown in FIG. 12 may be achieved by performing the first act and/or the second act); a third act (performed after the second act, for example) comprising positioning the protective structure 100 such that the antenna 802 at least partially fills the space 134 (shown in FIG. 7) and/or such that the antenna attachment aperture 128 is aligned with the first attachment unit 810 of the antenna 802 (e.g., the configuration shown in FIG. 13 may be achieved by performing the third act); and/or a fourth act (performed after the third act, for example) comprising fastening the second attachment unit to the first attachment unit 810 via the antenna attachment aperture 128 (e.g., the configuration shown in FIG. 14 may be achieved by performing the fourth act). The example process 1200 may comprise a fifth act (performed after the third act and/or the fourth act, for example) comprising feeding the cable tie 818 through the body 104 (via the one or more fastener-receiving apertures 108) and/or binding the cable 832 to the inner surface of the body 104 using the cable tie 818. Although FIG. 14 shows an example in which the second attachment unit is part of the mounting apparatus 1402 (e.g., the tripod), embodiments are contemplated in which the second attachment unit is part of a structure different than the mounting apparatus 1402 and/or in which the second attachment unit comprises a standalone fastener, such as at least one of a standalone screw, a standalone bolt, a standalone nut, etc. Fastening the second attachment unit to the first attachment unit 810 (via the antenna attachment aperture 128) attaches the protective structure 100 to the antenna 802.

When the protective structure 100 is attached to the antenna 802, the protective structure 100 protects the antenna 802 (e.g., the protective structure 100 protects the connector 804 of the antenna 802 and/or one or more other components of the antenna 802) and/or the cable 832 (e.g., the protective structure 100 protects the first cable connector 834 of the cable 832) from damage. For example, the protective structure 100 may act as a shock absorber and/or a damping device, wherein shock impulses, impacts, etc. are absorbed and/or damped by the protective structure 100 to inhibit and/or prevent damage to the antenna 802 and/or the cable 832, to improve a mechanical stability of the antenna 802 and/or to reduce stress on the antenna 802 and/or the cable 832 (e.g., reduce stress on the connector 804 of the antenna 802 and/or on the first cable connector 834 of the cable 832), thereby improving performance of the antenna 802 and/or increasing a longevity of the antenna 802. In an example scenario in which a collision occurs (e.g., the antenna 802 is dropped onto the ground, an object collides with the antenna 802 and/or the protective structure 100, etc.), the protective structure 100 may prevent and/or mitigate damage to the antenna 802 and/or the cable 832 by absorbing and/or damping an impact of the collision.

Figure 15:
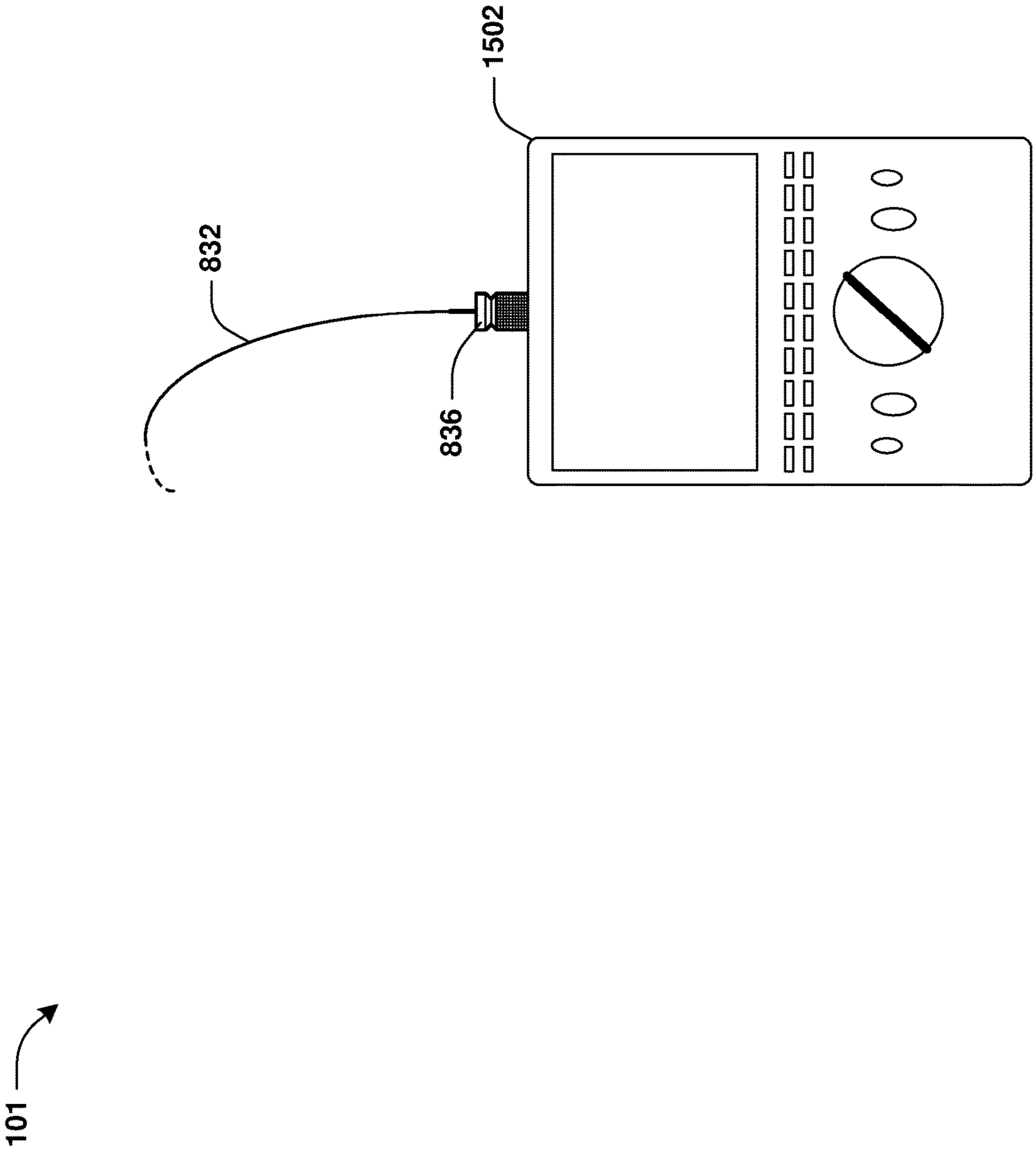
FIG. 15 is an illustration of a communication device 1502 according to some embodiments.

FIG. 15 illustrates a communication device 1502, according to some embodiments. The communication device 1502 may comprise a receiver and/or a transmitter. The antenna 802 may be coupled to the communication device 1502 via the cable 832. In some examples, the cable 832 may comprise a coaxial cable (e.g., an RF coaxial cable). The first cable connector 834 of the cable 832 (that is connected to the connector 804 of the antenna 802) may comprise an RF coaxial connector. The second cable connector 836 of the cable 832 may comprise an RF coaxial connector. The connector 804 of the antenna 802 may comprise an RF coaxial connector. In some examples, the second cable connector 836 may be coupled to the communication device 1502, such as coupled to a connector (e.g., an RF coaxial connector) of the communication device 1502. Accordingly, communication device 1502 may transmit and/or receive a signal to and/or from the antenna 802 via the cable 832.

The communication device 1502 may comprise a measurement device configured to measure and/or detect EMI, EMC, etc. using a signal from the antenna 802. In an example, the communication device may comprise a spectrum analyzer (e.g., a spectrum analyzer for EMC measurement). The communication device 1502 and/or the antenna 802 may be used to measure RF performance. The communication device 1502 and/or the antenna 802 may be used to detect and/or identify interference sources that introduce interference that can degrade performance and/or a capacity associated with wireless communication between wireless communication sites and UEs. For example, the interference may worsen a quality of telecommunication services provided by the wireless communication sites to the UEs, such as at least one of cellular service (e.g., 5G service, 4G service and/or other type of cellular service), internet service (e.g., cellular internet service, satellite internet service, 5G internet service, and/or other type of internet service), messaging service, etc. In response to identifying an interference source, corrective action may be taken to mitigate the interference source to improve network performance of one or more wireless communication sites.

In some examples, the communication device 1502 and/or the antenna 802 may be used to detect and/or identify interference sources by traveling with the communication device 1502 and/or the antenna 802 and/or monitoring an outputs of the communication device 1502 across different locations. In an example, the antenna 802 and/or the communication device 1502 may be in a motor vehicle (e.g., a car) that is used to transport the antenna 802 and/or the communication device 1502 across the different locations, wherein the antenna 802 may be mounted (e.g., placed) on an object in the motor vehicle (e.g., a dashboard of the motor vehicle) using the mounting apparatus 1402 (e.g., the tripod). Alternatively and/or additionally, the antenna 802 may be carried by hand (e.g., the tripod may be configured to convert into a handle that can be conveniently carried by hand by a person tasked with transporting the antenna 802). An interference source may be detected and/or identified based upon an output of the communication device 1502 (e.g., the output may be indicative of one or more radio metrics, such as at least one of one or more EMI metrics, one or more EMC metrics, etc.). In response to detecting and/or identifying the interference source, one or more corrective actions may be performed. For example, the one or more corrective actions may be performed to mitigate the interference source. For example, the one or more corrective actions may comprise checking, deactivating and/or replacing equipment (e.g., equipment determined to be the interference source) to mitigate and/or prevent interference of the interference source. Alternatively and/or additionally, the one or more corrective actions may comprise modifying one or more settings and/or parameters of equipment (e.g., equipment determined to be the interference source) to mitigate and/or prevent interference of the interference source.

In some examples, the antenna 802 may comprise a log-periodic antenna, such as a log-periodic dipole array (LPDA). In some examples, the antenna 802 may be a broadband measurement antenna, wherein the broadband. In some examples, the antenna 802 may have a frequency range from about 700 megahertz (MHz) to about 2.5 gigahertz (GHz) (or other frequency range). For example, the antenna may be used for mobile measurement and/or direction finding applications. Alternatively and/or additionally, the antenna may be configured for EMI measurement and/or EMC measurement. In some examples, the antenna 802 comprises a directional antenna. In some examples, the antenna 802 may be used as a directional-antenna for at least one of WLan, WiFi and/or one or more other directional communication applications. In some examples, the antenna 802 may have alignable (e.g., freely alignable) polarization).

According to some embodiments, a protective structure, to protect an antenna from damage, is provided. The protective structure includes a body. The body defines one or more prong-receiving apertures in a first surface of the body, wherein each prong of one or more prongs of the antenna extends at least partially through an aperture of the one or more prong-receiving apertures. The body defines a radio frequency (RF) connection aperture extending from the first surface of the body to a second surface of the body. The antenna includes an RF connector. A cable extends at least partially through the RF connection aperture. A cable connector of the cable is coupled to the RF connector.

According to some embodiments, a first prong-receiving aperture of the one or more prong-receiving apertures is defined by a plurality of inner sidewalls of the body; and one or more inner sidewalls, of the plurality of inner sidewalls of the body, are in contact with a prong, of the one or more prongs, extending through the first prong-receiving aperture.

According to some embodiments, the one or more inner sidewalls inhibit displacement of the protective structure relative to the antenna.

According to some embodiments, the one or more prong-receiving apertures include a first prong-receiving aperture and a second prong-receiving aperture; and the RF connection aperture is between the first prong-receiving aperture and the second prong-receiving aperture.

According to some embodiments, a direction of extension of the one or more prong-receiving apertures is parallel to a direction of extension of the RF connection aperture.

According to some embodiments, the protective structure includes a tongue over a surface of the antenna, wherein a mounting apparatus is attached to the antenna via an aperture in the tongue.

According to some embodiments, the mounting apparatus includes a tripod.

According to some embodiments, the antenna includes a broadband measurement antenna.

According to some embodiments, a first shape of a first prong-receiving aperture of the one or more prong-receiving apertures matches a second shape of a prong, of the one or more prongs, extending through the first prong-receiving aperture.

According to some embodiments, the first shape and the second shape are rectangular.

According to some embodiments, the body defines one or more fastener-receiving apertures in a third surface of the body, wherein the body is configured to receive a fastener through the one or more fastener-receiving apertures to provide strain relief to the cable and/or the RF connector.

According to some embodiments, the third surface is parallel to a direction of extension of the RF connection aperture.

According to some embodiments, the fastener includes a cable tie.

According to some embodiments, a protective structure, to protect an antenna from damage, is provided. The protective structure includes a body. The body defines one or more prong-receiving apertures in a first surface of the body, wherein through each aperture of the one or more prong-receiving apertures, the body is configured to receive a prong of one or more prongs of the antenna. The body defines a radio frequency (RF) connection aperture extending from the first surface of the body to a second surface of the body, wherein the body is configured to receive a cable through the RF connection aperture to couple a cable connector of the cable to an RF connector of the antenna.

According to some embodiments, the one or more prong-receiving apertures include a first prong-receiving aperture and a second prong-receiving aperture; and the RF connection aperture is between the first prong-receiving aperture and the second prong-receiving aperture.

According to some embodiments, a direction of extension of the one or more prong-receiving apertures is parallel to a direction of extension of the RF connection aperture.

According to some embodiments, the protective structure includes a tongue attached to the body, wherein the tongue defines an antenna attachment aperture; and the tongue is configured to receive a fastener through the antenna attachment aperture to attach a mounting apparatus and the protective structure to the antenna.

According to some embodiments, the mounting apparatus includes a tripod.

According to some embodiments, the body defines one or more fastener-receiving apertures in a third surface of the body; the body is configured to receive a fastener through the one or more fastener-receiving apertures to provide strain relief to the cable and/or the RF connector; the third surface of the body is opposite a fourth surface of the body to which the tongue is attached; and a direction of extension of the RF connection aperture is parallel to the third surface and/or the fourth surface.

According to some embodiments, a protective structure, to protect an antenna from damage, is provided. The protective structure includes a body. The body defines one or more prong-receiving apertures in a first surface of the body, wherein each prong of one or more prongs of the antenna extends at least partially through an aperture of the one or more prong-receiving apertures. The body defines a radio frequency (RF) connection aperture extending from the first surface of the body to a second surface of the body. The antenna includes an RF connector. At least a portion of the RF connector is within the RF connection aperture and/or a cable extends at least partially through the RF connection aperture. A cable connector of the cable is coupled to the RF connector.

Unless specified otherwise, "first," "second," and/or the like are not intended to imply a temporal aspect, a spatial aspect, an ordering, etc. Rather, such terms are merely used as identifiers, names, etc. for features, elements, items, etc.

For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A protective structure to protect an antenna from damage, comprising:

a body defining:

one or more prong-receiving apertures in a first surface of the body, wherein each prong of one or more prongs of the antenna extends at least partially through an aperture of the one or more prong-receiving apertures; and a connection aperture in the first surface of the body, wherein a cable extends at least partially through the connection aperture, wherein at least one of a prong-receiving aperture of the one or more prong-receiving apertures or the connection aperture extends from the first surface of the body to a second surface of the body.

2. The protective structure of claim 1, wherein:

a first prong-receiving aperture of the one or more prong-receiving apertures is defined by a plurality of inner sidewalls of the body; and one or more inner sidewalls, of the plurality of inner sidewalls of the body, are in contact with a prong, of the one or more prongs, extending through the first prong-receiving aperture.

3. The protective structure of claim 2, wherein:

the one or more inner sidewalls inhibit displacement of the protective structure relative to the antenna.

4. The protective structure of claim 1, wherein:

the one or more prong-receiving apertures comprise a first prong-receiving aperture and a second prong-receiving aperture; and the connection aperture is between the first prong-receiving aperture and the second prong-receiving aperture.

5. The protective structure of claim 4, wherein:

a direction of extension of the one or more prong-receiving apertures is parallel to a direction of extension of the connection aperture.

6. The protective structure of claim 1, comprising:

a tongue over a surface of the antenna, wherein a mounting apparatus is attached to the antenna via an aperture in the tongue.

7. The protective structure of claim 6, wherein:

the mounting apparatus comprises a tripod.

8. The protective structure of claim 7, wherein:

the antenna comprises a broadband measurement antenna.

9. The protective structure of claim 1, wherein:

a first shape of a first prong-receiving aperture of the one or more prong-receiving apertures matches a second shape of a prong, of the one or more prongs, extending through the first prong-receiving aperture.

10. The protective structure of claim 9, wherein:

the first shape and the second shape are rectangular.

11. The protective structure of claim 1, wherein:

the body defines one or more fastener-receiving apertures in a third surface of the body, wherein the body is configured to receive a fastener through the one or more fastener-receiving apertures to provide strain relief to at least one of the cable or a connector of the antenna.

12. The protective structure of claim 11, wherein:

the third surface is parallel to a direction of extension of the connection aperture.

13. The protective structure of claim 11, wherein:

the fastener comprises a cable tie.

14. A protective structure to protect an antenna from damage, comprising:

a body defining:

one or more prong-receiving apertures in a first surface of the body, wherein through each aperture of the one or more prong-receiving apertures, the body is configured to receive a prong of one or more prongs of the antenna; and a connection aperture in the first surface of the body, wherein at least one of a cable extends at least partially through the connection aperture or a cable connector of the cable is coupled to the antenna, wherein at least one of:

at least one of a prong-receiving aperture of the one or more prong-receiving apertures or the connection aperture extends from the first surface of the body to a second surface of the body;

the one or more prong-receiving apertures comprise a first prong-receiving aperture and a second prong-receiving aperture, and the connection aperture is between the first prong-receiving aperture and the second prong-receiving aperture;

the protective structure comprises a tongue over a surface of the antenna, wherein a mounting apparatus is attached to the antenna via an aperture in the tongue; or the body defines one or more fastener-receiving apertures in a third surface of the body, wherein the body is configured to receive a fastener through the one or more fastener-receiving apertures to provide strain relief to at least one of the cable or a connector of the antenna.

15. The protective structure of claim 14, wherein:

the one or more prong-receiving apertures comprise the first prong-receiving aperture and the second prong-receiving aperture; and the connection aperture is between the first prong-receiving aperture and the second prong-receiving aperture.

16. The protective structure of claim 14, wherein:

at least one of the prong-receiving aperture of the one or more prong-receiving apertures or the connection aperture extends from the first surface of the body to the second surface of the body.

17. The protective structure of claim 14, wherein:

the protective structure comprises the tongue over the surface of the antenna; and the mounting apparatus is attached to the antenna via the aperture in the tongue.

18. The protective structure of claim 17, wherein:

the body defines the one or more fastener-receiving apertures in the third surface of the body;

the body is configured to receive the fastener through the one or more fastener-receiving apertures to provide strain relief to at least one of the cable or the connector;

the third surface of the body is opposite a fourth surface of the body to which the tongue is attached; and a direction of extension of the connection aperture is parallel to at least one of the third surface or the fourth surface.

19. The protective structure of claim 14, wherein:

the body defines the one or more fastener-receiving apertures in the third surface of the body; and the body is configured to receive the fastener through the one or more fastener-receiving apertures to provide strain relief to at least one of the cable or the connector of the antenna.

20. A protective structure to protect an antenna from damage, comprising:

a body defining:

one or more prong-receiving apertures in a first surface of the body, wherein each prong of one or more prongs of the antenna extends at least partially through an aperture of the one or more prong-receiving apertures; and a connection aperture in the first surface of the body, wherein a cable connector of a cable is coupled to the antenna, wherein at least one of:

at least one of a prong-receiving aperture of the one or more prong-receiving apertures or the connection aperture extends from the first surface of the body to a second surface of the body;

the one or more prong-receiving apertures comprise a first prong-receiving aperture and a second prong-receiving aperture, and the connection aperture is between the first prong-receiving aperture and the second prong-receiving aperture;

the protective structure comprises a tongue over a surface of the antenna, wherein a mounting apparatus is attached to the antenna via an aperture in the tongue; or the body defines one or more fastener-receiving apertures in a third surface of the body, wherein the body is configured to receive a fastener through the one or more fastener-receiving apertures to provide strain relief to at least one of the cable or a connector of the antenna.

* * * * *